US012764014B2

(12) United States Patent
Li et al.

(10) Patent No.: US 12,764,014 B2
(45) Date of Patent: Oct. 13, 2026

(54) HOT BACKUP SWITCHING METHOD AND SYSTEM BASED ON NETWORK CARD DETECTION

(71) Applicant: Guangdong Baolun Electronics Co., Ltd., Guangzhou (CN)

(72) Inventors: Jingheng Li, Guangzhou (CN); Changhua Zhang, Guangzhou (CN); Zhenghui Zhu, Guangzhou (CN); Dingjin Zhao, Guangzhou (CN); De Ming, Guangzhou (CN); Di Lin, Guangzhou (CN)

(73) Assignee: Guangdong Baolun Electronics Co., Ltd., Guangzhou (CN)

( * ) Notice: Subject to any disclaimer, the term of this patent is extended or adjusted under 35 U.S.C. 154(b) by 269 days.

(21) Appl. No.: 18/665,166

(22) Filed: May 15, 2024

(65) Prior Publication Data

US 2024/0305520 A1 Sep. 12, 2024

Related U.S. Application Data

(63) Continuation of application No. PCT/CN2022/117470, filed on Sep. 7, 2022.

(30) Foreign Application Priority Data

Nov. 16, 2021 (CN) ......................... 202111357296.9

(51) Int. Cl.

| | |
|---|---|
| ***H04L 41/0663*** | (2022.01) |
| ***H04L 43/0823*** | (2022.01) |
| ***H04L 43/10*** | (2022.01) |

(52) U.S. Cl.

CPC ...... *H04L 41/0663* (2013.01); *H04L 43/0823* (2013.01); *H04L 43/10* (2013.01)

(58) Field of Classification Search

None

See application file for complete search history.

(56) References Cited

U.S. PATENT DOCUMENTS

2003/0061319 A1 3/2003 Manzardo
2012/0063299 A1* 3/2012 Narasimhan ........ G06F 11/2005 370/218

(Continued)

FOREIGN PATENT DOCUMENTS

| | | | |
|---|---|---|---|
| CN | 1567737 | A | 1/2005 |
| CN | 106789246 | A | 5/2017 |
| CN | 111130862 | A | 5/2020 |

*Primary Examiner* — Scott M Sciacca

(74) *Attorney, Agent, or Firm* — MUNCY, GEISSLER, OLDS & LOWE, P.C.

(57) ABSTRACT

A hot backup switching method and system based on network card detection. The method includes the following steps: S1: driving a first synchronous network card to send a query instruction to a second synchronous network card according to a preset time interval; S2: determining whether the first synchronous network card obtains a response packet sent by a master server device, if yes, executing S1; and if not and executing S3; S3: determining whether the working mode of the playback terminal belongs to a master mode; and if yes, and executing S4; and S4: determining whether the second synchronous network card responds, if yes, executing S1. Hot backup switching is implemented by means of the network cards of the master server device and the slave server device, and seamless switching and continued playback are realized.

8 Claims, 4 Drawing Sheets

(56) References Cited

U.S. PATENT DOCUMENTS

| | | | | |
|---|---|---|---|---|
| 2014/0036660 | A1* | 2/2014 | Ogaki | H04L 12/12 370/254 |
| 2015/0326331 | A1* | 11/2015 | Knowles | H04J 3/065 370/350 |
| 2020/0067761 | A1* | 2/2020 | Schmitt | G06F 11/2038 |
| 2020/0073761 | A1* | 3/2020 | Xiang | G06F 11/2025 |
| 2020/0359104 | A1* | 11/2020 | Luo | H04N 21/4884 |

* cited by examiner

HOT BACKUP SWITCHING METHOD AND SYSTEM BASED ON NETWORK CARD DETECTION

CROSS REFERENCE TO RELATED APPLICATIONS

This application is a Continuation of co-pending International Application No. PCT/CN2022/117470, filed on Sep. 7, 2022, for which priority is claimed under 35 U.S.C. § 120; and this application claims priority of Application No. 202111357296.9 filed in China on Nov. 16, 2021 under 35 U.S.C. § 119; the entire contents of all of which are hereby incorporated by reference.

TECHNICAL FIELD

The present application relates to the technical field of digital broadcasting network transmission, and particularly relates to a hot backup switching method and system based on network card detection.

BACKGROUND

With the development of digital network broadcasting industry, the fields and scales involved by the digital network broadcasting industry are expanded, and many new broadcasting projects begin to use digital network audio broadcasting instead of traditional analog audio broadcasting. At the same time, some projects and fields have high requirements for stability and reliability of broadcasting systems. However, due to design limitations and hardware performance limitations of general network broadcasting equipment, it is difficult to ensure audio playback stability and reliability of systems, resulting in that the fields having high requirements for stability and reliability are blocked out. Especially for a sudden failure, e.g., when a server connected with an external signal source has an unexpected accident, it basically means that the entire broadcasting system enters a paralysis state. Communication fault detection and other means are usually used to avoid faults when performing important broadcasting tasks such as listening test and station announcement. However, communication fault detection in conventional settings will consume a lot of server resources; the higher the requirement for a communication fault detection result is, the more the server fluency and sound quality will be affected, so that the system is prone to instability during operation.

SUMMARY

To overcome the defects in the prior art, one purpose of the present application is to provide a hot backup switching method based on network card detection, which can solve the problem that communication fault detection in conventional settings will consume a lot of server resources, and the server fluency and sound quality will be affected, so that the system is prone to instability during operation.

Another purpose of the present application is to provide a hot backup switching system based on network card detection, which can solve the problem that communication fault detection in conventional settings will consume a lot of server resources, and the server fluency and sound quality will be affected, so that the system is prone to instability during operation.

To achieve the one of the above purposes, the present application adopts the following technical solution:

A hot backup switching method based on a network card detection, comprising the following steps:

S1: Driving a first synchronous network card of a slave server device to send a query instruction to a second synchronous network card of a master server device according to a preset time interval, so as to obtain a response packet sent by the second synchronous network card;

S2: Determining whether the first synchronous network card obtains a response packet sent by a master server device, if yes, executing S1; and if not, sending a working mode query instruction to a playback terminal, and executing S3;

S3: Determining whether the working mode of the playback terminal belongs to a master mode, if not, a slave server device sending a switching instruction to the playback terminal; and if yes, driving the playback terminal to continuously send a plurality of query instructions to the master server device, and executing S4; and S4: Determining whether the second synchronous network card responds to the query instructions of the playback terminal, if yes, executing S1, and if not, driving the slave server device to perform hot backup switching.

Preferably, the method further comprises a GPS module used for satellite time service, and both the master server device and the slave server device are connected with the GPS module.

Preferably, the slave server device comprises the first synchronous network card and a slave server used for connecting with an audio source, the master server device comprises the second synchronous network card and a master server used for connecting with the audio source, the master server and the slave server are connected through the first synchronous network card and the second synchronous network card, and the first synchronous network card and the second synchronous network card are connected with the playback terminal.

Preferably, before the step S1, the method further comprises the following steps:

S01: Obtaining an electrical signal from the slave server, and querying the current address of the second synchronous network card through the first synchronous network card;

S02: Determining whether the first synchronous network card obtains the current address of the second synchronous network card within a preset time period, if yes, driving the GPS module to provide time service for the master server device and the slave server device synchronously, and executing S1; and if not, querying the working mode of the playback terminal, and executing S03; and S03: Determining whether the working mode of the playback terminal belongs to a master mode, if not, marking the slave server device as the master server device, and if yes, executing S01.

Preferably, the step S1 is specifically implemented by the following steps:

S11: Driving the master server device and slave server device to play back the same audio frame simultaneously;

S12: Driving the second synchronous network card to send the audio frame played back by the master server to the playback terminal, and driving the first synchronous network card to cut off the audio frame played back by the slave server; and S13: Driving the first synchronous network card to send a query instruction to the second synchronous network card according to a preset time interval, so as to obtain a response packet sent by the second synchronous network card.

Preferably, the step S4 is specifically implemented by the following steps:

S41: Determining whether the second synchronous network card responds to the query instructions of the playback terminal, if yes, executing S13, and if not, executing S42; and S42: Driving the first synchronous network card to send the audio played back by the slave server to the playback terminal, and marking the slave server device as the master server device.

Preferably, the working mode of the playback terminal is either a master mode in playback state or an idle mode in idle state.

To achieve the other of the above purposes, the present application adopts the following technical solution:

A hot backup switching system based on network card detection, comprising the master server device, the slave server device and the playback terminal, wherein the slave server device comprises the first synchronous network card and a slave server used for connecting with an audio source, the master server device comprises the second synchronous network card and a master server used for connecting with the audio source, the master server and the slave server are connected through the first synchronous network card and the second synchronous network card, and the first synchronous network card and the second synchronous network card are connected with the playback terminal.

Preferably, the system further comprises a GPS module used for satellite time service, and both the master server and the slave server are connected with the GPS module.

Compared with the prior art, the present application has the following beneficial effects: dual-server hot backup switching detection is carried out by the first synchronous network card and the second synchronous network card to avoid the impact of non-timeliness and computing efficiency of the servers, and high-speed dual-server hot backup switching is realized by the advantages of the hardware to reduce resource occupation of servers, so that the fluency and stability of the servers are ensured; further, the GPS module is used to provide time service for the master server device and the slave server device synchronously to synchronize timestamps of the master server device and the slave server device, and the same audio frame is played back at the same timestamp to realize audio synchronization, so that seamless switching of audio playback can be realized during the dual-server hot backup switching of the system, and a reliable and stable network broadcasting function is provided for the system.

DETAILED DESCRIPTION

Preferred embodiments of the present application will be explained below in detail in combination with drawings. It should be understood that the preferred embodiments described below are only used for describing and explaining the present application, but are not used for limiting the present application.

It should be noted in the description of the present application that terms such as “central”, “upper”, “lower”, “left”, “right”, “vertical”, “horizontal”, “inner”, “outer”, etc. indicate direction or position relationships shown based on the drawings, and are only intended to facilitate the description of the present application and the simplification of the description rather than to indicate or imply that the indicated device or element must have a specific direction or constructed and operated in a specific direction, and therefore, shall not be understood as a limitation to the present application. In addition, the terms such as “first”, “second” and “third” are only used for the purpose of description, rather than being understood to indicate or imply relative importance.

It should be noted in the explanation of the present application that, unless otherwise specifically regulated and defined, terms such as “installation,” “connected,” and “connecting” shall be understood in broad sense, and for example, may refer to fixed connection or detachable connection or integral connection, may refer to mechanical connection or electrical connection, and may refer to direct connection or indirect connection through an intermediate medium or inner communication of two elements. For those ordinary skilled in the art, the specific meanings of the above terms in the present application may be understood according to specific conditions.

The present application is further described below in combination with drawings and specific embodiments.

Figure 1:
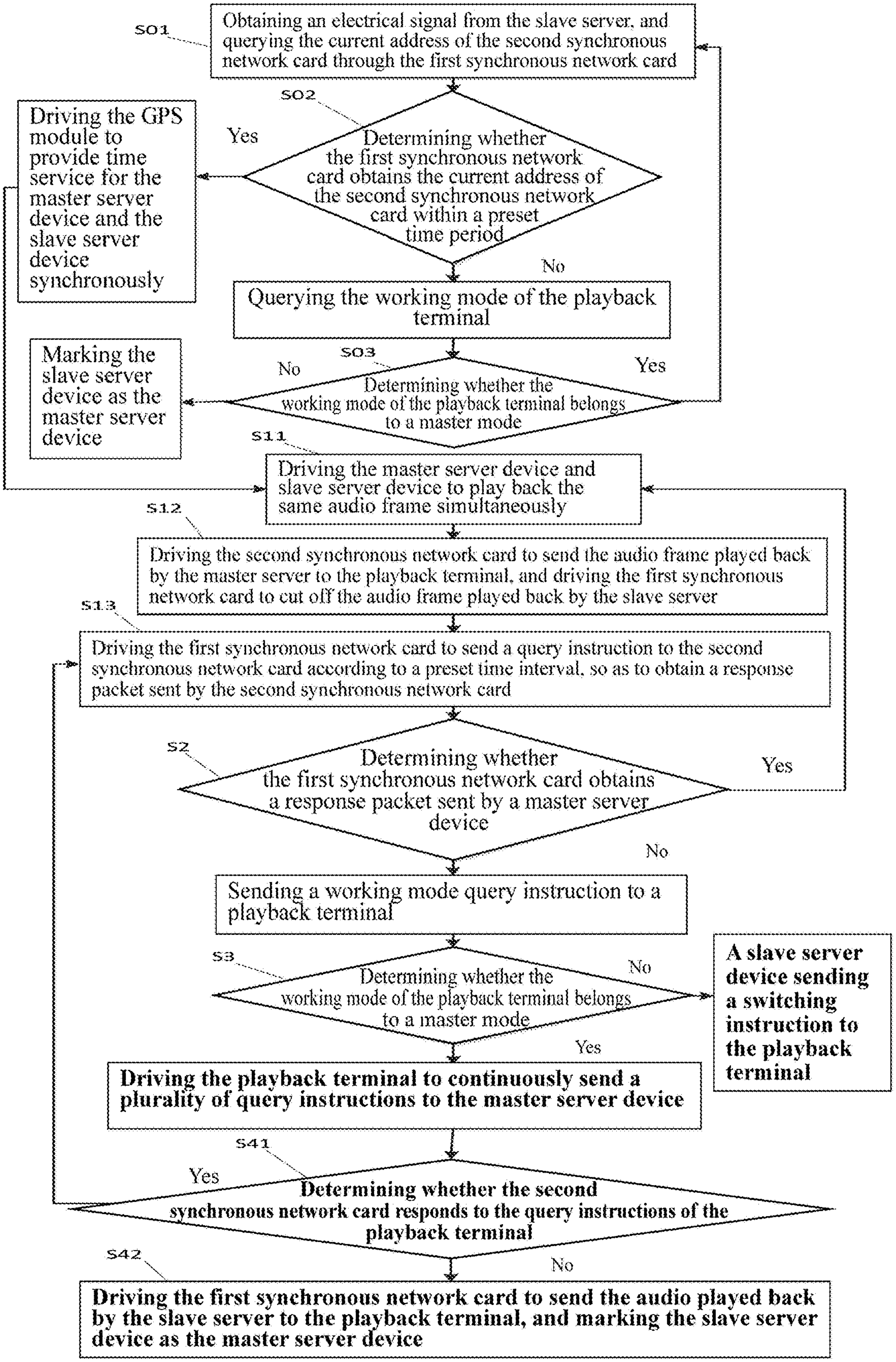
FIG. 1 is a flow chart of a hot backup switching method based on network card detection of the present application.
Figure 2:
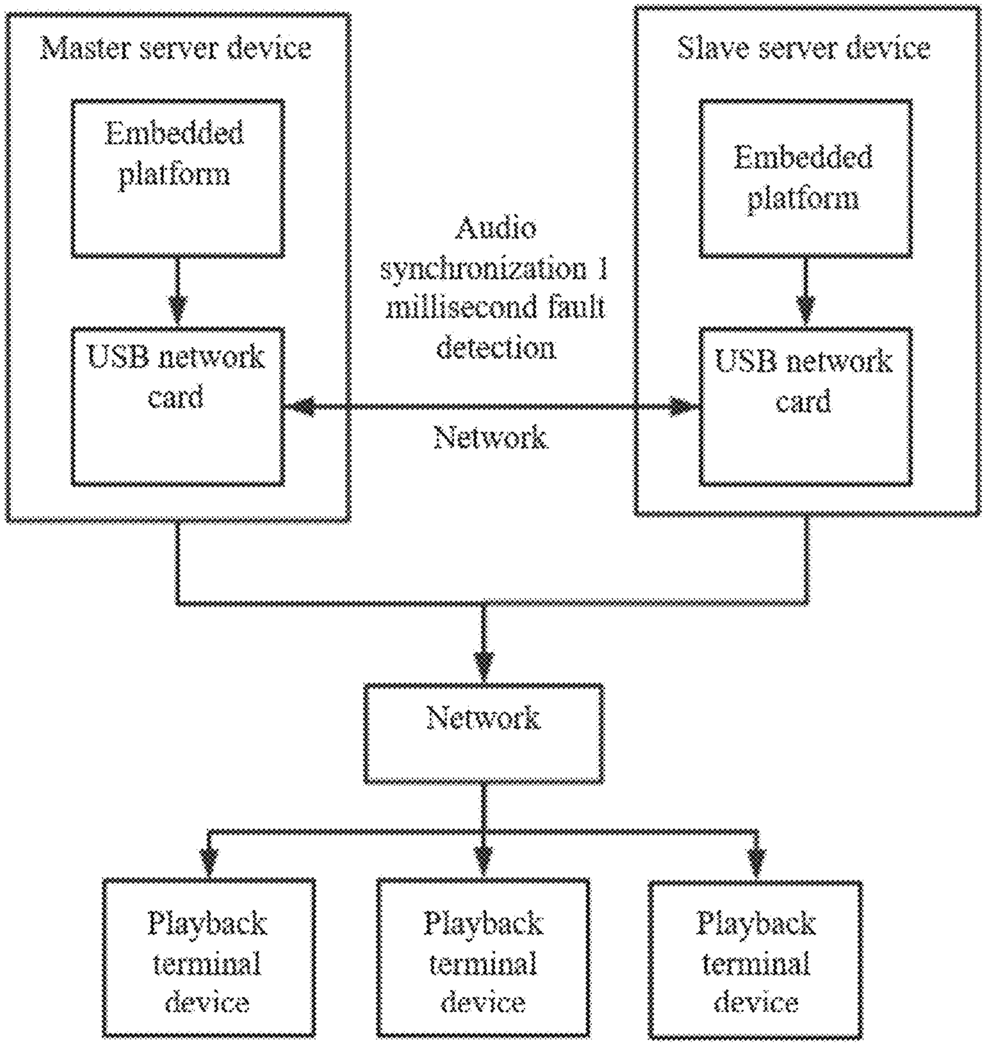
FIG. 2 is a schematic diagram of practical application of a hot backup switching system based on network card detection of the present application.
Figure 3:
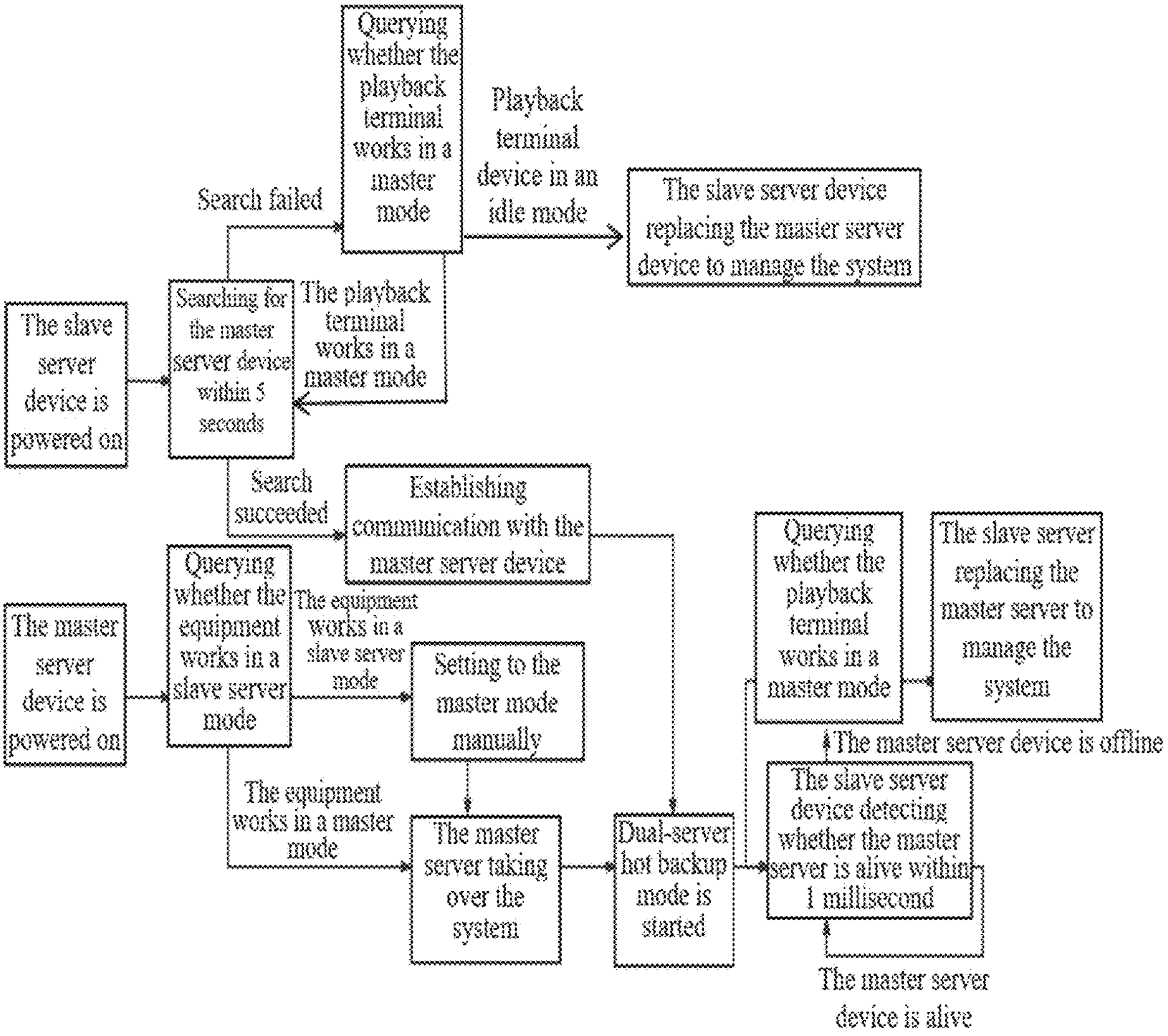
FIG. 3 is a schematic diagram of practical application of a hot backup switching method based on network card detection of the present application.
Figure 4:
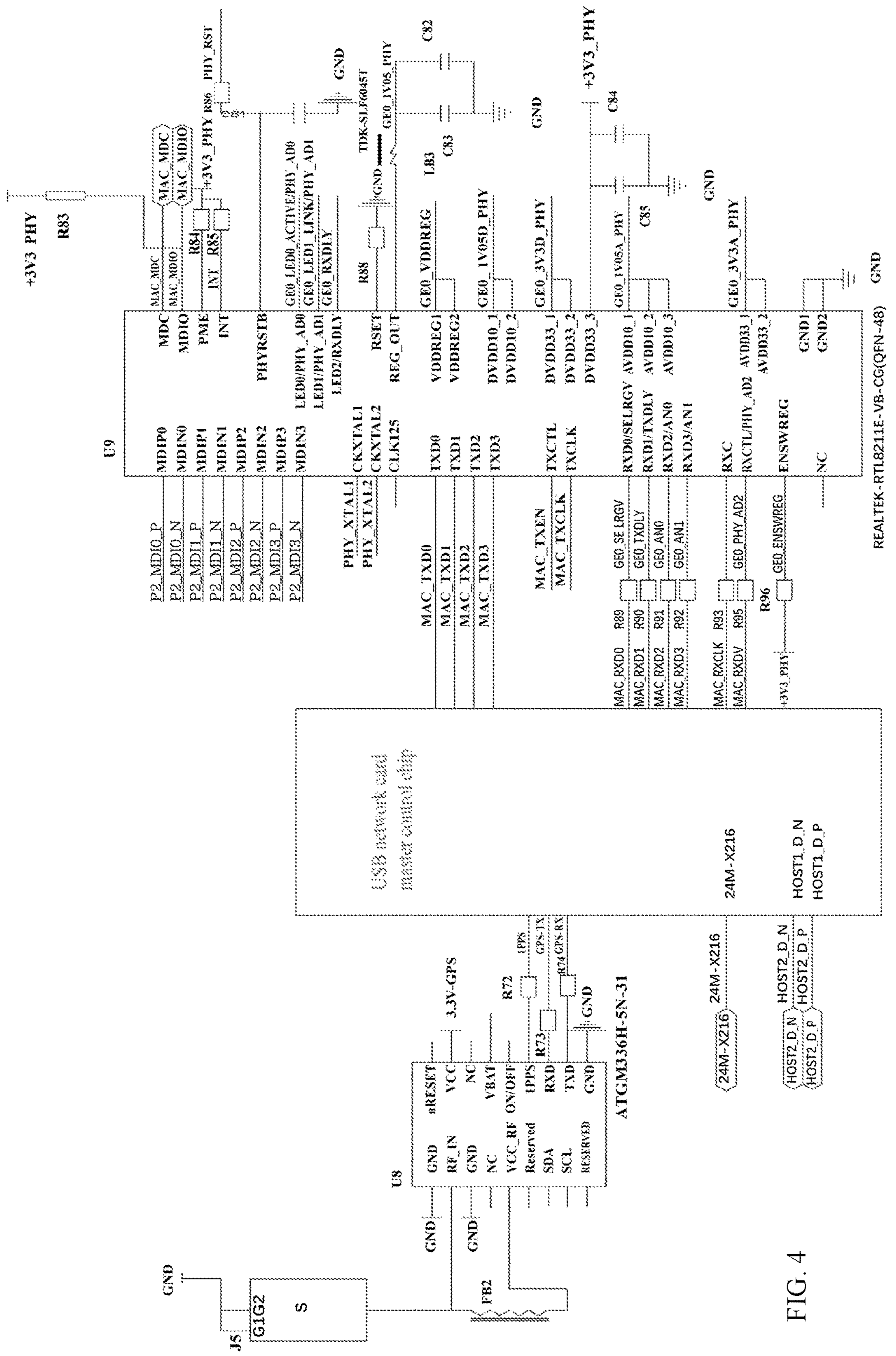
FIG. 4 is a circuit diagram of a first synchronous network card or a second synchronous network card of the present application.

In the present application, both the master server device and the slave server device are in double-layer settings; preferably, the slave server device comprises the first synchronous network card and a slave server used for connecting with an audio source, the master server device comprises the second synchronous network card and a master server used for connecting with the audio source, the master server and the slave server are connected through the first synchronous network card and the second synchronous network card, and the first synchronous network card and the second synchronous network card are connected with the playback terminal. Both the master server and the slave server are embedded platforms, both the first synchronous network card and the second synchronous network card are USB gigabit network cards, and a schematic diagram thereof is shown in FIG. 4; interaction is conducted based on a high-speed detection technology of underlying network data of the hardware; the master server and the slave server are connected with a switch through the USB gigabit network cards to conduct network communication and data interaction; and the USB gigabit network cards can be used as general network cards in usual. In the embodiment, network data of specified ports can be captured by the USB gigabit network cards, broadcast data is sent to the specified ports by an upper-layer application, and then the network cards can be controlled or communication with the network cards can be realized; preferably, the target IP and ports of USB Gigabit network card hot backup detection and the IP and ports of a playback terminal device can be configured by the master server and the slave server through network instructions, so that the network card of the slave server device can communicate directly with the master server device or the playback terminal device without application layer control. The network card of the master server device can also communicate directly with the slave server device or the playback terminal device without application layer control.

Embodiment 1

As shown in FIGS. 1-4, a hot backup switching method based on a network card detection, comprising the following steps:

S01: Obtaining an electrical signal from the slave server, and querying the current address of the second synchronous network card through the first synchronous network card;

Specifically, after the slave server device is powered on, the first synchronous network card starting to search for the address of the master server device; preferably, after the slave server is powered on, the first synchronous network card starting to query the current address of the second synchronous network card and establishing a communication channel with the second synchronous network.

Preferably, a terminal configuration tool can be used to search for the devices and configure the IP address of each device (the address of the master server device and the address of the slave server device) in a network broadcasting mode, so that after the first synchronous network card is configured by the configuration tool, the IP address of the second synchronous network card is directly obtained, and the target IP address can be queried directly.

S02: Determining whether the first synchronous network card obtains the current address of the second synchronous network card within a preset time period, if yes, driving the GPS module to provide time service for the master server device and the slave server device synchronously, and executing S1; and if not, querying the working mode of the playback terminal, and executing S03; and Specifically, if the first synchronous network card can obtain the current IP address of the second synchronous network card within 5 seconds, establishing the communication channel between the first synchronous network card and the second synchronous network card to perform hot backup detection; preferably, the method further comprises a GPS module used for satellite time service, and both the master server device and the slave server device are connected with the GPS module; after establishing the communication channel between the first synchronous network card and the second synchronous network card, driving the GPS module to provide time service for the master server device and the slave server device synchronously, and obtaining timestamps by GPS time service; the timestamp deviation between the master server device and the slave server device shall not be more than 20 us, so as to ensure that the same audio frame is played back at the same timestamp by the master server and the slave server. if the first synchronous network card cannot obtain the current IP address of the second synchronous network card within 5 seconds, the first synchronous network card sending a working mode query instruction to the playback terminal by to query the working mode of the playback terminal, so as to determine whether the master server device is still in normal working.

S03: Determining whether the working mode of the playback terminal belongs to a master mode, if not, marking the slave server device as the master server device, and if yes, executing S01.

Specifically, if the first synchronous network card cannot obtain the current IP address of the second synchronous network card within 5 seconds, querying the working mode of the playback terminal; preferably, the working mode of the playback terminal is either a master mode in playback state or an idle mode in idle state; if the playback terminal is still in the master mode at present, it indicates that the master server device is still in a normal working state, so that the first synchronous network card is driven to start to search for the address of the master server device again; if the playback terminal is still in the idle mode at present, it indicates that the playback terminal has no playback task, and the master server device has a high probability of failure, so that the slave server device is marked as the master server device to replace the original master server device to manage and control the system.

S1: Driving a first synchronous network card of a slave server device to send a query instruction to a second synchronous network card of a master server device according to a preset time interval, so as to obtain a response packet sent by the second synchronous network card;

Specifically, after establishing a communication channel between the master server device and the slave server device, the first synchronous network card will send heartbeat packets to the second synchronous network card periodically to ensure the state of the master server device; it should be noted that the heartbeat packets and the response packet are sent and received by the first synchronous network card and the second synchronous network card without the intervention of the master server or the slave server; in the embodiment, the step S1 is specifically implemented by the following steps:

S11: Driving the master server device and slave server device to play back the same audio frame simultaneously;

Specifically, providing synchronous satellite time service in advance to drive the master server device and slave server device to play back the same audio frame simultaneously, so as to ensure seamless audio switching.

S12: Driving the second synchronous network card to send the audio frame played back by the master server to the playback terminal, and driving the first synchronous network card to cut off the audio frame played back by the slave server; and Specifically, sending the audio from the audio source to the playback terminal by the master server through the second synchronous network card to enable the playback terminal to play back the audio; at the same time, the audio frame played back by the slave server are cut off by the first synchronous network card and will not be distributed.

S13: Driving the first synchronous network card to send a query instruction to the second synchronous network card according to a preset time interval, so as to obtain a response packet sent by the second synchronous network card.

Specifically, sending query instructions (heartbeat packets) to the second synchronous network card every 1 millisecond by the first synchronous network card; after the query instructions sent by the first synchronous network card are received by the second synchronous network card, sending a response packet to the first synchronous network card to ensure the state of the master server device.

S2: Determining whether the first synchronous network card obtains a response packet sent by a master server device, if yes, executing S1; and if not, sending a working mode query instruction to a playback terminal, and executing S3;

Specifically, if no response packet sent by the second synchronous network card is received by the first synchronous network card in a continuous 5-millisecond period, sending a working mode query instruction by the playback terminal to verify the current state of the master server device and realize hot backup switching; if response packets sent by the second synchronous network card are received by the first synchronous network card in a continuous 5-millisecond period, executing S1 again, and sending the query instructions (heartbeat packets) to the second synchronous network card every 1 millisecond.

S3: Determining whether the working mode of the playback terminal belongs to a master mode, if not, a slave server device sending a switching instruction to the playback terminal; and if yes, driving the playback terminal to continuously send a plurality of query instructions to the master server device, and executing S4; and Specifically, when the working mode query instructions sent by the first synchronous network card are received by the playback terminal, sending the working mode (master mode or idle mode) of the playback terminal to the first synchronous network card; when the working mode of the playback terminal is the idle mode, a slave server device sending a switching instruction to the playback terminal and replacing the original master server device to manage and control the system; when the working mode of the playback terminal is the master mode, driving the playback terminal to continuously send 3 query instructions to the master server device to further verify the current state of the master server device; the whole switching and detection process is carried out by the underlying network cards without the involvement of the upper-layer embedded platforms, so that the hot backup switching of the slave server device can be completed within 10 milliseconds, the playback terminal device is detected and confirmed, and the reliability and timeliness of the system are ensured by the dual detection mechanism.

S4: Determining whether the second synchronous network card responds to the query instructions of the playback terminal, if yes, executing S1, and if not, driving the slave server device to perform hot backup switching.

Specifically, if the second synchronous network card responds to the query instructions of the playback terminal, it indicates that the master server device still works normally; if the second synchronous network card cannot respond to the query instructions of the playback terminal, it indicates that the master server device may be offline; in the embodiment, the step S4 is specifically implemented by the following steps:

S41: Determining whether the second synchronous network card responds to the query instructions of the playback terminal, if yes, executing S13, and if not, executing S42; and Specifically, if the second synchronous network card responds to the query instructions of the playback terminal, it indicates that the master server device still works normally, then driving the first synchronous network card to send a query instruction to the second synchronous network card according to a preset time interval, so as to obtain a response packet sent by the second synchronous network card; if the second synchronous network card cannot respond to the query instructions of the playback terminal, it indicates that the master server device may be offline.

S42: Driving the first synchronous network card to send the audio played back by the slave server to the playback terminal, and marking the slave server device as the master server device;

Specifically, if the second synchronous network card cannot respond to the query instructions of the playback terminal, it indicates that the master server device may be offline; at the same time, hot backup switching of the slave server is carried out to take over the system, the audio frame data played back on the slave server is distributed by the first synchronous network card to the playback terminal device to replace the master server device for continued playback.

Embodiment 2

As shown in FIGS. 1-4, a hot backup switching system based on network card detection, comprising the master server device, the slave server device and the playback terminal, wherein the slave server device comprises the first synchronous network card and a slave server used for connecting with an audio source, the master server device comprises the second synchronous network card and a master server used for connecting with the audio source, the master server and the slave server are connected through the first synchronous network card and the second synchronous network card, and the first synchronous network card and the second synchronous network card are connected with the playback terminal. Preferably, the system further comprises a GPS module used for satellite time service, and both the master server and the slave server are connected with the GPS module.

For those skilled in the art, various other corresponding changes and modifications can be made according to the technical solution and concept described above, and all these changes and modifications should fall within the protection scope of the claims of the present application.

What is claimed is:

1. A hot backup switching method based on network card detection, comprising the following steps:

S1: driving a first synchronous network card of a slave server device to send a query instruction to a second synchronous network card of a master server device according to a preset time interval, so as to obtain a response packet sent by the second synchronous network card;

S2: determining whether the first synchronous network card obtains a response packet sent by the master server device, if yes, executing S1; and if not, sending a query instruction of a working mode to a playback terminal, and executing S3;

S3: determining whether the working mode to the playback terminal belongs to a master mode, if not, the slave server device sending a switching instruction to the playback terminal; and if yes, driving the playback terminal to continuously send a plurality of query instructions to the master server device, and executing S4; and S4: determining whether the second synchronous network card responds to the query instructions of the playback terminal, if yes, executing S1, and if not, driving the slave server device to perform hot backup switching;

wherein the method further comprises a Global Positioning System (GPS) module used for satellite time service, and both the master server device and the slave server device are connected with the GPS module;

wherein the slave server device comprises the first synchronous network card and a slave server used for connecting with an audio source, the master server device comprises the second synchronous network card and a master server used for connecting with the audio source, the master server and the slave server are connected through the first synchronous network card and the second synchronous network card, and the first synchronous network card and the second synchronous network card are connected with the playback terminal;

wherein before the step S1, the method further comprises the following steps:

S01: obtaining an electrical signal from the slave server, and querying the current address of the second synchronous network card through the first synchronous network card;

S02: determining whether the first synchronous network card obtains the current address of the second synchronous network card within a preset time period, if yes, driving the GPS module to provide time service for the master server device and the slave server device synchronously, and executing S1; and if not, querying the working mode to the playback terminal, and executing S03; and S03: determining whether the working mode of to the playback terminal belongs to a master mode, if not, marking the slave server device as the master server device, and if yes, executing S01.

2. The hot backup switching method based on network card detection according to claim 1, wherein the step S1 is specifically implemented by the following steps:

S11: driving the master server device and the slave server device to play back the same audio frame simultaneously;

S12: driving the second synchronous network card to send the audio frame played back by the master server to the playback terminal, and driving the first synchronous network card to cut off the audio frame played back by the slave server; and S13: driving the first synchronous network card to send a query instruction to the second synchronous network card according to a preset time interval, so as to obtain a response packet sent by the second synchronous network card.

3. The hot backup switching method based on network card detection according to claim 2, wherein the step S4 is specifically implemented by the following steps:

S41: determining whether the second synchronous network card responds to the query instructions of the playback terminal, if yes, executing S13, and if not, executing S42; and S42: driving the first synchronous network card to send the audio frame played back by the slave server to the playback terminal, and marking the slave server device as the master server device.

4. A hot backup switching system based on network card detection, the system is used in the hot backup switching method based on network card detection in claim 3, wherein the system comprises the master server device, the slave server device and the playback terminal, the slave server device comprises the first synchronous network card and the slave server used for connecting with the audio source, the master server device comprises the second synchronous network card and the master server used for connecting with the audio source, the master server and the slave server are connected through the first synchronous network card and the second synchronous network card, and the first synchronous network card and the second synchronous network card are connected with the playback terminal;

the system further comprises the GPS module used for satellite time service, and both the master server and the slave server are connected with the GPS module.

5. A hot backup switching system based on network card detection, the system is used in the hot backup switching method based on network card detection in claim 2, wherein the system comprises the master server device, the slave server device and the playback terminal, the slave server device comprises the first synchronous network card and the slave server used for connecting with the audio source, the master server device comprises the second synchronous network card and the master server used for connecting with the audio source, the master server and the slave server are connected through the first synchronous network card and the second synchronous network card, and the first synchronous network card and the second synchronous network card are connected with the playback terminal;

the system further comprises the GPS module used for satellite time service, and both the master server and the slave server are connected with the GPS module.

6. The hot backup switching method based on network card detection according to claim 1, wherein the working mode to the playback terminal is either a master mode in playback state or an idle mode in idle state.

7. A hot backup switching system based on network card detection, the system is used in the hot backup switching method based on network card detection in claim 6, wherein the system comprises the master server device, the slave server device and the playback terminal, the slave server device comprises the first synchronous network card and the slave server used for connecting with the audio source, the master server device comprises the second synchronous network card and the master server used for connecting with the audio source, the master server and the slave server are connected through the first synchronous network card and the second synchronous network card, and the first synchronous network card and the second synchronous network card are connected with the playback terminal;

the system further comprises the GPS module used for satellite time service, and both the master server and the slave server are connected with the GPS module.

8. A hot backup switching system based on network card detection, the system used in the hot backup switching method based on network card detection in claim 1, wherein the system comprises the master server device, the slave server device and the playback terminal, the slave server device comprises the first synchronous network card and the slave server used for connecting with the audio source, the master server device comprises the second synchronous network card and the master server used for connecting with the audio source, the master server and the slave server are connected through the first synchronous network card and the second synchronous network card, and the first synchronous network card and the second synchronous network card are connected with the playback terminal;

the system further comprises the GPS module used for satellite time service, and both the master server and the slave server are connected with the GPS module.

* * * * *